United States Patent

Staiger et al.

[11] 4,260,710
[45] Apr. 7, 1981

[54] PROCESS FOR THE PREPARATION OF HOMOPOLYMERS AND COPOLYMERS OF α-MONOOLEFINS

[75] Inventors: Gerhard Staiger, Bobenheim-Roxheim; James F. R. Jaggard, Ludwigshafen; Paul Schneider, Mutterstadt, all of Fed. Rep. of Germany

[73] Assignee: BASF Aktiengesellschaft, Fed. Rep. of Germany

[21] Appl. No.: 72,984

[22] Filed: Sep. 6, 1979

[30] Foreign Application Priority Data

Sep. 25, 1978 [DE] Fed. Rep. of Germany ........ 2841645

[51] Int. Cl.³ ............................ C08F 4/66; C08F 10/06
[52] U.S. Cl. ................................ 526/142; 252/429 B; 526/351; 526/906
[58] Field of Search ........................................ 526/142

[56] References Cited

U.S. PATENT DOCUMENTS

| | | | |
|---|---|---|---|
| 3,116,274 | 12/1963 | Boehm et al. | 526/142 |
| 3,506,629 | 4/1970 | van den Berg et al. | 526/142 |
| 3,990,994 | 11/1976 | Appleyard et al. | 526/142 |
| 4,107,412 | 8/1978 | Welch | 526/125 |
| 4,107,416 | 8/1978 | Giannini et al. | 526/159 |
| 4,154,699 | 5/1979 | Mueller-Tamm et al. | 526/142 |

FOREIGN PATENT DOCUMENTS

47-25706  7/1972 Japan ........................................ 526/142

*Primary Examiner*—Edward J. Smith
*Attorney, Agent, or Firm*—Keil & Witherspoon

[57] ABSTRACT

A process for the preparation of homopolymers and copolymers of α-monoolefins by means of a Ziegler-Natta catalyst system comprising (1) a titanium halide of the formula

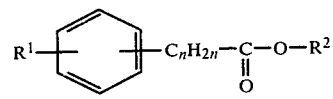

where m is a number from 0 to 0.5, (2) an oxygen compound of the formula

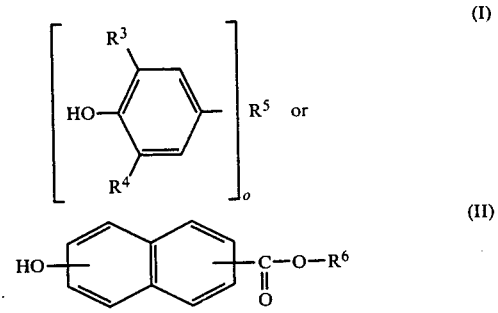

where $R^1$ is hydrogen, $C_1$-$C_4$-alkyl or $C_1$-$C_4$-alkoxy, $R^2$ is $C_1$-$C_4$-alkyl and n is an integer from 0 to 3, and (3) an appropriate conventional aluminum-alkyl, the titanium halide (1) and the oxygen compound (2) having been milled together before use, wherein the catalyst system employed contains, as a further component (4), a phenolic compound of the formula (I)

(II)

where $R^3$ is $C_1$-$C_6$-alkyl, $R^4$ is hydrogen or $C_1$-$C_6$-alkyl, $R^5$ is hydrogen or a saturated hydrocarbon radical of not more than 30 carbon atoms which may also contain not more than a total of 6 ether groups and/or ester groups, $R^6$ is $C_2$-$C_{24}$-alkyl and o is an integer from 1 to 6.

3 Claims, No Drawings

PROCESS FOR THE PREPARATION OF HOMOPOLYMERS AND COPOLYMERS OF α-MONOOLEFINS

The present invention relates to a process for the preparation of homopolymers and copolymers of $C_2$–$C_6$-α-monoolefins at from 20° to 160° C., especially from 50° to 120° C., and under a pressure of from 1 to 100, especially from 20 to 70, bar, by means of a Ziegler-Natta catalyst system comprising (1) a titanium halide of the formula

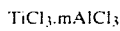

$$TiCl_3 \cdot mAlCl_3$$

where m is a number from 0 to 0.5, especially from 0.1 to 0.4, (2) an oxygen compound of the formula

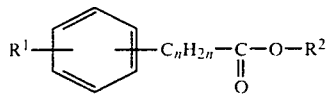

where $R^1$ is hydrogen, $C_1$–$C_4$-alkyl or $C_1$–$C_4$-alkoxy, preferably hydrogen or $C_1$–$C_2$-alkyl, and especially hydrogen, $R^2$ is $C_1$–$C_4$-alkyl, especially ethyl, and n is an integer from 0 to 3, especially 1, and (3) an aluminum-alkyl of the formula

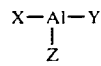

where X and Y are each alkyl of not more than 8, especially not more than 2, carbon atoms, and Z is chlorine or alkyl of not more than 8, especially not more than 2, carbon atoms, with the proviso that (I) the molar ratio of titanium halide (1):oxygen compound (2) is from 1:1 to 20:1, especially from 3:1 to 6:1, (II) the molar ratio of titanium halide (1):aluminum-alkyl (3) is from 1:1 to 1:20, especially from 1:2 to 1:15 and (III) the titanium halide (1) and the oxygen compound (2) have been milled together before use.

Processes of this type are known; their special feature relative to comparable other processes is in the specific nature of the catalyst system used, a typical example being given in German Laid-Open Application DOS No. 2,658,939.

The specific modifications of the catalyst system are made in order to achieve particular objectives, for example the following:

(a) Catalyst systems which on polymerization of α-monoolefins, especially propylene, give polymers with a relatively high proportion of stereoregular (=isotactic) polymer.

(b) Catalyst systems which can give an increased yield of polymer, namely systems of increased productivity, ie. systems where the amount of polymer formed per unit weight of catalyst system is increased.

(c) Catalyst systems which introduce less halogen into the polymer, which is achievable by increasing the yield according to (b) and/or by employing a titanium halide which contains very little halogen.

(d) Catalyst systems which retain a constant or relatively constant activity maximum over a very long time, which is of substantial importance for the catalyst yield.

(e) Catalyst systems which make it possible, by increasing the polymerization temperature, to increase the conversion without a significant reduction in the stereoregularity of the polymers, an effect which is generally desirable, especially in dry phase polymerization.

(f) Catalyst systems by means of which—especially at relatively high polymerization temperatures—the morphological properties of the polymers can be influenced in a particular way, for example in giving a uniform particle size and/or reducing the proportion of fines and/or giving a high bulk density; these factors may, for example, be significant in respect of technical control of the polymerization system, of working up of the polymers and/or of processability of the polymers.

(g) Catalyst systems which are simple and safe to prepare and easy to handle, for example systems which can be prepared in (inert) hydrocarbon auxiliary media.

(h) Catalyst systems which make it possible, where the polymerization is carried out in the presence of a molecular weight regulator, especially hydrogen, to manage with relatively small amounts of regulator; this can be significant, for example, in respect of the thermodynamics of the process.

(i) Catalyst systems which are tailored for specific polymerization processes, for example catalysts which are suited either to the specific peculiarities of suspension polymerization or to the specific peculiarities of dry phase polymerization.

(j) Catalyst systems which give polymers having a pattern of properties which makes them particularly suitable for one or other field of use.

Experience to date has shown that amongst the various objectives there are some which can only be achieved by special embodiments of the catalyst system if other objectives are lowered.

Under these circumstances it is in general desirable to find embodiments which not only achieve the particular objectives but also demand minimum lowering of other desirable objectives.

It is an object of the present invention to provide a novel embodiment of a catalyst system by means of which better results can be achieved—for similar objectives—than with conventional embodiments.

We have found that this object is achieved with a catalyst system of the type defined at the outset, which contains, as a further component (4), a particular phenolic compound.

Accordingly, the present invention relates to a process for the preparation of homopolymers and copolymers of $C_2$–$C_6$-α-monoolefins at from 20° to 160° C., especially from 50° to 120° C., under pressures of from 1 to 100 bar, especially from 20 to 70 bar, by means of a Ziegler-Natta catalyst system comprising (1) a titanium halide of the formula
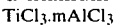
$$TiCl_3 \cdot mAlCl_3$$

where m is a number from 0 to 0.5, especially from 0.1 to 0.4, (2) an oxygen compound of the formula

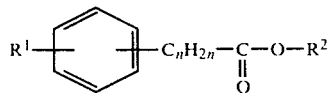

where $R^1$ is hydrogen, $C_1$–$C_4$-alkyl or $C_1$–$C_4$-alkoxy, preferably hydrogen or $C_1$–$C_2$-alkyl, and especially hydrogen, $R^2$ is $C_1$–$C_4$-alkyl, especially ethyl, and n is an integer from 0 to 3, especially 1, and (3) an aluminum-alkyl of the formula

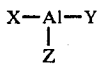

where X and Y are each alkyl of not more than 8, especially not more than 2, carbon atoms, and Z is chlorine or alkyl of not more than 8, especially not more than 2, carbon atoms, with the proviso that (I) the molar ratio of titanium halide (1):oxygen compound (2) is from 1:1 to 20:1, especially from 3:1 to 6:1, (II) the molar ratio of titanium halide (1):aluminum-alkyl (3) is from 1:1 to 1:20, especially from 1:2 to 1:15 and (III) the titanium halide (1) and the oxygen compound (2) have been milled together before use, wherein a catalyst system is employed which contains, as a further component (4), a phenolic compound of the formula

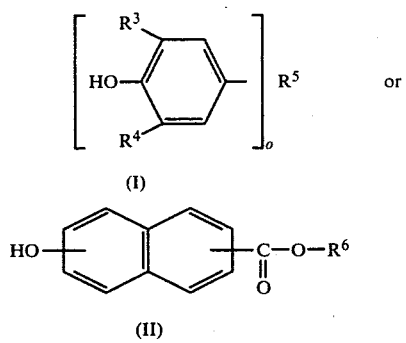

where $R^3$ is $C_1$–$C_6$-alkyl, especially $C_3$–$C_4$-alkyl, $R^4$ is hydrogen or $C_1$–$C_6$-alkyl, especially $C_3$–$C_4$-alkyl, $R^5$ is hydrogen or a saturated hydrocarbon radical of not more than 30, especially not more than 24, carbon atoms which may contain up to a total of 6, especially up to a total of 4, ether groups and/or ester groups $R^6$ is $C_2$–$C_{24}$-alkyl, especially $C_4$–$C_{18}$-alkyl and o is an integer from 1 to 6, especially from 1 to 4, with the proviso that the molar ratio aluminum-alkyl (3):phenolic compound (4) is from 1:1 to 40:1, especially from 3:1 to 25:1.

The following details regarding the process according to the invention may be noted:

The polymerization process as such can—taking into account its characterizing feature—be carried out in virtually all relevant conventional technological embodiments, ie. as a batchwise, cyclic or continuous process, which may, for example, be a suspension polymerization process, solution polymerization process or dry phase polymerization process. The technological embodiments mentioned, ie. the technological embodiments of the Ziegler-Natta polymerization of α-monoolefins, are well-known from the literature and from industrial practice and do not require more detailed comments.

For completeness, it should be mentioned that in the process according to the invention the molecular weights of the polymers can be regulated by the relevant conventional measures, eg. by means of regulators, especially hydrogen.

Further, it is to be noted that in the process according to the invention the components of the catalyst system can be introduced into the polymerization space in various ways, for example (i) by introducing the product obtained by milling the titanium halide (1) and the oxygen compound (2), as one component, and the aluminum-alkyl (3) and the phenolic compound (4) as two further components, all at the same place, (ii) by introducing the same three components all at different places, (iii) by introducing the product obtained by milling (1) and (2), on the one hand, and a mixture of (3) and (4), on the other, at different places, which may in particular be advantageous in dry phase polymerization processes, or (iv) by introducing a mixture of the product obtained by milling (1) and (2) and the phenolic compound (4), on the one hand, and the aluminum-alkyl (3), on the other, at different places.

Finally, it is to be pointed out that the advantageous features of the process according to the invention in general manifest themselves particularly if the process is carried out as a dry phase polymerization (typical examples of such polymerization processes being given in German Published Applications DAS Nos. 1,217,071, 1,520,307 and 1,520,373).

One of the features of the process according to the invention is that the titanium halide (1) and the oxygen compound (2) have been milled together before use. This milling can again be carried out by relevant conventional methods, most simply by conjointly treating the two components in a vibratory mill, especially a vibratory ball mill, for a period of from 2 to 50 hours at from 0° to 40° C., with a milling acceleration of from 30 to 80 m.sec$^{-2}$, in the presence or, preferably, in the absence of a diluent. However, milling can also be carried out by special methods, for example that described in German Laid-Open Application DOS No. 2,658,939, already referred to above.

Regarding the materials used in the novel catalyst system, the following details should be noted:

The titanium halide (1) employed can be a titanium halide conventionally used in Ziegler-Natta catalyst systems, for example a reaction product obtained on reducing a titanium tetrahalide with hydrogen, aluminum or an aluminum-organic compound. Compounds which have proved very suitable are, for example, trichlorides of the formula $TiCl_3$, as obtained by reducing titanium tetrachloride with hydrogen, and especially co-crystals, as obtained by co-crystallizing $TiCl_3$ and $AlCl_3$ or reducing $TiCl_4$ with aluminum or with mixtures of aluminum and titanium. Co-crystals of the formula $TiCl_3 \cdot \frac{1}{3} AlCl_3$ are particularly suitable. The appropriate titanium halides (1) are commercially available and hence do not require further comment.

Suitable oxygen compounds (2) having the formula shown are again the relevant conventional compounds of this formula, eg. those where $R^1$ is hydrogen, methyl, ethyl, n-propyl, n-butyl, i-propyl, i-butyl, tert.-butyl, methoxy, ethoxy, n-propoxy or n-butoxy and $R^2$ is methyl, ethyl, n-propyl, n-butyl, i-propyl, i-butyl or tert.-butyl. Typical examples of very suitable oxygen compounds (2) are methyl and ethyl phenylacetate, 3-phenylpropionate and 4-phenylbutyrate, especially ethyl phenylacetate.

Suitable aluminum-alkyls (3) of the stated formula are again the relevant conventional compounds of this formula; these are so well known from the literature and from industrial practice that they do not require more detailed discussions here. Particularly important examples are triethyl-aluminum and diethyl-aluminum chloride.

Regarding the phenolic compounds (4), the use of which is characteristic of the invention, the following may be noted:

Typical examples of very suitable compounds of the stated formula (I) are those where $R^3$ is tert.-butyl, $R^4$ is hydrogen or tert.-butyl, $R^5$ is hydrogen or lower alkyl, eg. methyl, ethyl, n-propyl, i-propyl, n-butyl, i-butyl or tert.-butyl and $o=1$. Further important examples are those where $R^3$ and $R^4$ are the same as above and $R^5$ may be represented by the formula

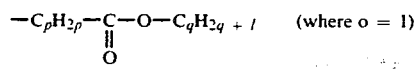  (where $o = 1$)

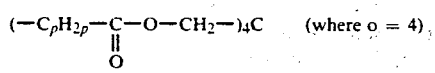  (where $o = 4$)

where p is an integer from 0 to 5, especially 1 to 4, and q is an integer from 6 to 24, especially 8 to 18, and where the $-C_pH_{2p}-$ and $-C_qH_{2q+1}$ groups preferably contain a straight chain.

Important examples of very suitable compounds having the stated formula (I) are 1-hydroxy-2,6-di-tert.-butylbenzene, 4-hydroxy-3,5-di-tert.-butyltoluene, the esters of n-octanol, n-dodecanol and n-octadecanol with β-(4'-hydroxy-3',5'-di-tert.-butylphenyl)-propionic acid and the tetra-ester of the above acid with pentaerythritol, and also 1,3,5-trimethyl-2,4,6-tris-(3,5-di-tert.-butyl-4-hydroxy-benzyl)-benzene.

Typical examples of very suitable compounds having the stated formula (II) are those of which the acid component is derived from 2-hydroxy-4-naphthoic acid, 1-hydroxy-2-naphthoic acid, 2-hydroxy-1-naphthoic acid or 1-hydroxy-8-naphthoic acid and the alcohol component from n-octanol, n-dodecanol or n-octadecanol.

Important examples of very suitable compounds having the stated formula (II) are n-octadecyl 2-hydroxy-4-naphthoate, n-dodecyl 1-hydroxy-8-naphthoate, n-octadecyl 1-hydroxy-8-naphthoate, n-octyl 1-hydroxy-2-naphthoate and n-octadecyl 2-hydroxy-1-naphthoate.

The process according to the invention makes it possible to prepare homopolymers and copolymers of $C_2$–$C_6$-α-monoolefins in an advantageous manner, particularly suitable polymerizable α-monoolefins being propylene, but-1-ene and 4-methylpent-1-ene and—in copolymers—ethylene.

EXAMPLES 1 TO 4

The starting materials of the catalyst system are
(1) a titanium halide of the formula $TiCl_3.0.33\ AlCl_3$,
(2) ethyl phenylacetate as the oxygen compound,
(3) diethyl-aluminum chloride as the aluminum-alkyl and
(4) the phenolic compound shown in the Table below.

Before use, the titanium halide (1) and the oxygen compound (2) have been milled together, in the molar ratio of 3:1, in a vibratory ball mill for a period of 50 hours at 20° C., with a milling acceleration of 50 m.sec$^{-2}$, in the absence of a diluent.

To carry out the polymerization, 1,000 parts by weight of n-heptane are introduced into a stirred vessel in the absence of air and moisture, after which the following are added: 2.3 parts by weight of catalyst component (3), sufficient of the product obtained by milling components (1) and (2) to give a molar ratio titanium halide (1):aluminum-alkyl (3) of 1:2.5, and sufficient of catalyst component (4) to give a molar ratio aluminum-alkyl (3):phenolic compound (4) having the value shown in the Table.

The actual polymerization is carried out with propylene at a temperature of 60° C. under a monomer pressure of 1 bar for 3 hours, whilst stirring, after which the polypropylene formed is isolated in the conventional manner; its amount, and its proportion insoluble in boiling n-heptane are shown in the Table.

COMPARATIVE EXPERIMENT A

The procedure followed is exactly as in Examples 1 to 4, with the sole exception that no phenolic compound is added.

The result is again shown in the Table.

EXAMPLES 5 AND 6

The starting materials (1), (2) and (3) of the catalyst system are the same as in Examples 1 to 4; the particular starting material (4) is shown in the Table.

To carry out the polymerization, the following are introduced into a pressure-resistant stirred vessel, with exclusion of air and moisture: 10,000 parts by weight of liquid propylene, 18 liters (S.T.P.) of hydrogen (as a molecular weight regulator), 1.68 parts by weight of catalyst component (3), sufficient of the product obtained by milling components (1) and (2) to give a molar ratio titanium halide (1):aluminum-alkyl (3) of 1:7, and sufficient of catalyst component (4) to give a molar ratio aluminum-alkyl (3):phenolic compound (4) having the value shown in the Table.

The actual polymerization is carried out at a temperature of 80° C. under a monomer pressure of 38 bar for 2 hours, whilst stirring, after which the polypropylene formed is isolated in the conventional manner; its amount, and its proportion insoluble in boiling n-heptane, are shown in the Table.

COMPARATIVE EXPERIMENT B

The procedure followed is exactly as in Examples 5 and 6, with the sole exception that no phenolic compound is added.

The result is again shown in the Table.

In the Table:

TABLE

| Example or Comparative Experiment | Phenolic compound Nature | Molar ratio (3):(4) | Polypropylene parts by weight | percentage insoluble in $n$-$C_7H_{16}$ |
|---|---|---|---|---|
| 1 | ODBB | 5:1 | 212 | 98.7% |
| 2 | ODBT | 5:1 | 218 | 98.5% |
| 3 | ODBP | 5:1 | 270 | 98.8% |
| 4 | TEOP | 10:1 | 212 | 98.4% |
| A | — | — | 188 | 98.1% |
| 5 | ODBP | 21:1 | 3,550 | 96.8% |
| 6 | TEOP | 21:1 | 3,050 | 97.2% |
| B | — | — | 3,090 | 94.1% |

ODBB = 1-hydroxy-2,6-di-tert.-butylbenzene
ODBT = 4-hydroxy-3,5-di-tert.-butyltoluene
ODBP = n-octadecyl β(4'-hydroxy-3',5'-di-tert.-butylphenyl)-propionate
TEOP = tetra-ester of β-(4'-hydroxy-3',5'-di-tert.-butylphenyl)-propionic acid with pentaerythritol.

We claim:
1. In a process for the preparation of homopolymers and copolymers of $C_2$–$C_6$-α-monoolefins at from 20° to

160° C. under pressures of from 1 to 100 bar, by means of a Ziegler-Natta catalyst system comprising (1) a titanium halide of the formula $$TiCl_3 \cdot mAlCl_3$$

where m is a number from 0 to 0.5, (2) an oxygen compound of the formula

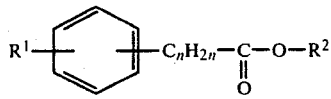

where $R^1$ is hydrogen, $C_1$–$C_4$-alkyl or $C_1$–$C_4$-alkoxy, $R^2$ is $C_1$–$C_4$-alkyl and n is an integer from 0 to 3, and (3) an aluminum-alkyl of the formula $$X-\underset{\underset{Z}{|}}{Al}-Y$$

where X and Y are each alkyl of not more than 8 carbon atoms, and Z is chlorine,
wherein (I) the molar ratio of titanium halide (1):oxygen compound (2) is from 1:1 to 20:1, (II) the molar ratio of titanium halide (1):aluminum-alkyl (3) is from 1:1 to 1:20, and (III) the titanium halide (1) and the oxygen compound (2) have been milled together before use, the improvement which comprises employing a catalyst system which contains, as a further component (4), a phenolic compound of the formula

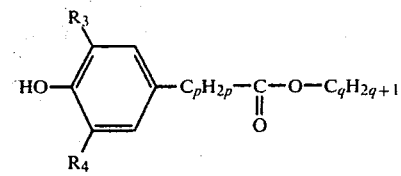

where
$R_3$ is tert-butyl,
$R_4$ is hydrogen or tert-butyl,
p is an integer of 1 to 4,
q is an integer of 8 to 18,
—$C_pH_{2p}$— is straight-chained, and
—$C_qH_{2q+1}$ is straight-chained
with the proviso that the molar ratio aluminum-alkyl (3):phenolic compound (4) is from 3:1 to 25:1.

2. The process of claim 1, wherein component (2) is ethyl phenylacetate.

3. The process of claims 1 or 2, wherein component (4) is n-octadecyl β-(4'-hydroxy-3', 5'-di-tert-butyl-phenyl)-propionate.

* * * * *